United States Patent

Haar, Jr.

[11] Patent Number: 5,998,491
[45] Date of Patent: Dec. 7, 1999

[54] SUPER-ABSORBING POLYMERIC NETWORKS

[75] Inventor: Joseph P. Haar, Jr., Wheaton, Ill.

[73] Assignee: Donlar Corporation, Bedford Park, Ill.

[21] Appl. No.: 09/014,066

[22] Filed: Jan. 27, 1998

[51] Int. Cl.⁶ .............................. C07D 243/00; C08J 9/36
[52] U.S. Cl. .......................... 521/64; 521/183; 521/184; 528/322; 528/328; 528/332; 528/363; 528/480; 528/482
[58] Field of Search .............................. 521/64, 183, 184; 528/322, 328, 332, 363, 480, 492

[56] References Cited

U.S. PATENT DOCUMENTS

| | | | |
|---|---|---|---|
| 3,846,380 | 11/1974 | Fujimoto et al. | 260/78 |
| 5,057,597 | 10/1991 | Koskan | 528/328 |
| 5,116,513 | 5/1992 | Koskan et al. | 210/698 |
| 5,219,952 | 6/1993 | Koskan et al. | 525/419 |
| 5,221,733 | 6/1993 | Koskan et al. | 530/333 |
| 5,284,936 | 2/1994 | Donachy et al. | 530/350 |
| 5,461,085 | 10/1995 | Nagatomo et al. | 521/183 |
| 5,508,434 | 4/1996 | Batzel et al. | 548/520 |
| 5,612,384 | 3/1997 | Ross et al. | 521/64 |
| 5,859,179 | 1/1999 | Chow | 521/183 |

FOREIGN PATENT DOCUMENTS

92/17525  10/1992  WIPO.

*Primary Examiner*—Morton Foelak
*Attorney, Agent, or Firm*—Olson & Hierl, Ltd.

[57] ABSTRACT

Super-absorbing polymeric networks of crosslinked polyaspartates are produced from crosslinked polysuccinimide. Super-absorbing polymeric networks are produced in a single reaction vessel by crosslinking polysuccinimide with at least one organic polyamine crosslinking agent in the presence of at least one nitrogenous base. The reaction is carried out in an aqueous reaction mixture to produce a polymeric network of crosslinked polyaspartate.

18 Claims, No Drawings

SUPER-ABSORBING POLYMERIC NETWORKS

Crosslinked polypeptides containing a relatively high percentage of anionic amino acids, such as aspartic acid or glutamic acid, which are said to be useful as absorbing materials are disclosed in U.S. Pat. No. 5,284,936 to Donachy et al. Although such materials have improved saline absorbency and are biodegradable, the relatively expensive cost of the starting amino acids makes such materials uneconomical. Likewise, the use of gamma irradiation to produce crosslinked polyaspartate as described by M. Tomida et al., *Polymer*, 38(11):2791–2795 (1997) is impractical due to the need for highly ionizing radiation and long exposure times.

U.S. Pat. No. 5,612,384 to Ross et al. describes the crosslinking of polysuccinimide with diamines in a polar aprotic solvent and subsequent hydrolysis of succinimide units with alkali metal hydroxides to form crosslinked polyaspartates which are super-absorbent polymer networks of excellent quality. However, the use of polar aprotic solvents and the removal of such solvent residues adds costs to this process. U.S. Pat. No. 5,612,384 also discloses a method of crosslinking polysuccinimides with diamines in aqueous suspension with simultaneous hydrolysis of the remaining succinimide units by alkali metal hydroxides to produce polyaspartate based super-absorbing polymeric networks. Although this particular method has the advantage of using water instead of solvents, it does not produce super-absorbing polymeric networks of the same high quality and degree of absorbency as the solvent based method.

Therefore, there is still a need for an improved, economical, preferably water-based, method of producing polyaspartate based super-absorbing polymeric, networks by a chemical modification of polysuccinimide. The methods of this invention satisfy this need.

SUMMARY OF THE INVENTION

The present invention provides an efficient method of producing biodegradable, super-absorbing polymeric networks by chemical modification of polysuccinimide. The term "polymeric networks" as used herein refers to random copolymers of crosslinked polyaspartate which can swell or gel in water or electrolyte solutions. The term "super-absorbing polymeric networks" and grammatical variations thereof as used herein refer to polymeric networks of crosslinked polyaspartates which can absorb at least about 10 times to more than 200 times their weight in water, and at least about 10 times to more than about 30 times their weight of an electrolyte solution such as synthetic urine.

Super-absorbing polymeric networks can be produced by several embodiments of the present invention, each of which involves a simultaneous crosslinking and hydrolysis reaction of polysuccinimide in an aqueous medium that contains at least one organic polyamine base having at least two primary amine groups as a crosslinking agent and at least one nitrogenous base. The crosslinking agent can be utilized in the form of a free base or as a salt of a mineral acid or organic acid. The nitrogenous base preferably is ammonia, an organic base, or an amino acid having, in an aqueous alkaline solution, an ionizable amino group with a pK of at least about 8.

One preferred method aspect comprises reacting polysuccinimide in water with a polyamine crosslinking agent that is an organic base having at least two primary amine groups in an amount sufficient to form crosslinked polysuccinimide and in the presence of nitrogenous base which provides sufficient alkalinity to substantially simultaneously hydrolyze to aspartate units the crosslinked polysuccinimide and any remaining succinimide monomer units in the polymer. When aqueous ammonia, a primary amine or a secondary amine is utilized as the nitrogenous base, aspartamide or N-alkylaspartamide units are formed in the resulting super-absorbing polymeric network product. Preferably the total nitrogen functionality with respect to succinimide functionality is maintained at a mole ratio of about 1:1.

Advantageously, super-absorbing polymeric networks of this invention can be economically prepared. in a single reaction vessel using aqueous reaction media and then readily isolated for use.

The super-absorbing polymeric networks of the present invention are useful in a wide variety of applications where liquid absorption, viscosity modification, chemical sequestration or dehydration, and the like is required or desired. Exemplary applications include the use of polymeric networks as super-absorbents in diapers, incontinence products and sanitary napkins; as humectants in agricultural products; for seed coatings, and soil conditioning; as sludge coagulants in water treatment; as viscosity modifiers in the petroleum industry; as dehydrating agents; as chemical absorbents (e.g. for clean-up of chemical spills); for controlled release of chemicals or drugs; for microencapsulation; as thickening agents; as fire retardants or fire control agents; as artificial snow for skiing; as media for electrophoresis and chromatography (e.g. for gel permeation chromatography, capillary electrophoresis, etc.); in soft contact lens manufacture; in surgical dressings; in transportation of fresh food or seafood; in textiles; in pulp and paper manufacture; in filter media for de-watering; and as moisturizing components in consumer products, such as personal care products, cosmetics or the like.

DETAILED DESCRIPTION OF THE INVENTION

The term "polyaspartate" and grammatical variations thereof as used herein, includes polyaspartic acid, copolymers of aspartic acid with other monomers as well as salts of polyaspartic acid or polyaspartic acid copolymers.

Polysuccinimides suitable for preparing super-absorbing polymeric networks of the present invention can be synthesized by any of several methods known in the art. Numerous methods exist in the art for the polymerization of aspartic acid to polysuccinimide. See, for example, Koskan et al. in U.S. Pat. Nos. 5,057,597, 5,116,513, 5,219,952 and 5,221,733; and Batzel et al. U.S. Pat. No. 5,508,434. Fox and Harada, *Journal of the American Chemical Society*, 82, 3745–3751 (1959), disclose the use of phosphoric acid to catalyze the polymerization of aspartic acid to produce high molecular weight polysuccinimides.

Thus, suitable polysuccinimides can include, without limitation, products of the thermal polymerization of aspartic acid; thermal polymerization of aspartic acid in the presence of phosphoric acid or polyphosphoric acid; thermal polymerization of monoethylenically unsaturated dicarboxylic acids (e.g. fumaric acid, maleic acid, itaconic acid, citraconic acid, aconitic acid, and the like) or anhydrides thereof with ammonia or amines; thermal polymerization of maleamic acid or fumaramic acid; and copolymers of the aforesaid monomers with carboxylic acids, amines, alcohols, amino acids and other carboxyl containing monomers and the like.

The term "polysuccinimide" as used herein defines a homopolymer having the structural formula (I), wherein n is greater than about 5, or a copolymer containing structural units (I) with other co-monomers.

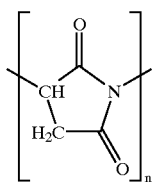
(I)

The polymeric super-absorbing networks of this invention are random copolymers structurally comprised of monomer units of succinimide (structural formula S), alpha-aspartate (structural formula A), beta-aspartate (structural formula B) and crosslinking dimeric aspartamides (structural formula having any one of the following three structural formulas, $L^1$, $L^2$, and $L^3$). For convenience, these will be referred to generally as structural formula (L).

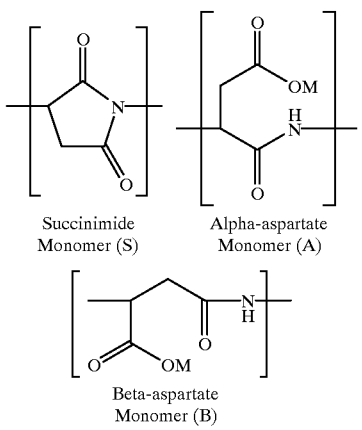

Succinimide Monomer (S)    Alpha-aspartate Monomer (A)

Beta-aspartate Monomer (B)

In the structural units A and B, M can be hydrogen, an alkali metal cation such as $Na^+$, $K^+$ or $Li^+$, ammonium, quaternary ammonium, or alkyl ammonium, dialkyl ammonium or trialkyl ammonium.

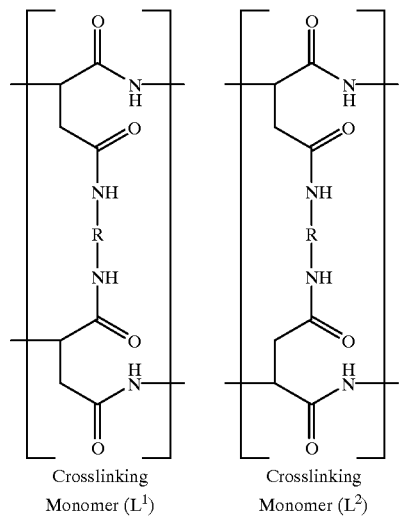

Crosslinking Monomer ($L^1$)    Crosslinking Monomer ($L^2$)

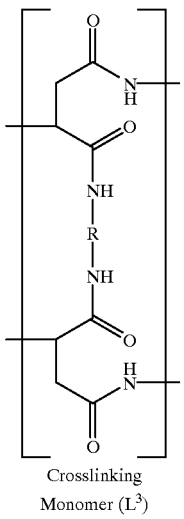

Crosslinking Monomer ($L^3$)

In the structural L units, $L^1$, $L^2$ and $L^3$ R is a divalent organic linking group derived from the organic crosslinking agent. The organic crosslinking agent preferably is an organic base containing at least two primary amine groups capable of reacting with a succinimide monomer unit to form a crosslink thereof. For convenience, reference to "L units" includes any one of the foregoing monomeric crosslinking L structural units without limitation.

Optionally, the super-absorbing polymeric networks of the present invention may contain alpha-aspartamide (structural formula C) or beta-aspartamide (structural formula D) structural units

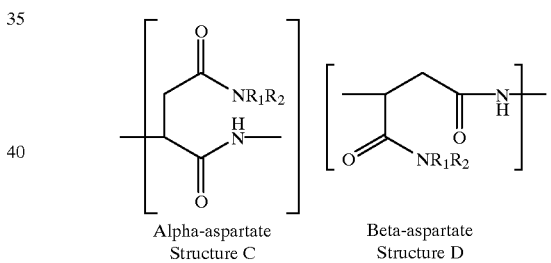

Alpha-aspartate Structure C    Beta-aspartate Structure D wherein $R^1$ and $R^2$ are independently selected from the group consisting of H, $C_1$ to $C_{20}$ alkyl or substituted alkyl, aryl or substituted aryl, $NH_2$, NHOH, $C_1$ to $C_{20}$ hydroxyalkyl, $C_1$ to $C_{20}$ thioalkyl, sulfonoalkyl or phosphonoalkyl, and dialkylamino substituted $C_1$ to $C_{20}$ alkyl.

The term "crosslinked polyaspartate" or "crosslinked polyaspartic acid" as used herein refers to polymeric networks which are water-swellable and electrolyte solution-swellable random copolymers structurally comprised primarily of A, B, and L structural units and optionally C and D structural units. Preferably, crosslinked polyaspartates contain no S units or a relatively small amount thereof, e.g., less than about 20% S units.

For convenience, the methods of this invention will be illustrated and discussed using polyamine crosslinking agents. The term "polyamine crosslinking agent" as used herein includes organic bases having at least two primary amine groups available for reaction with the succinimide monomer units of a polysuccinimide to form a crosslink. The polyamine crosslinking agents may be utilized in the free base form or as salts of a mineral acid or of an organic acid.

Preferably, the weight average molecular weight ($M_w$) of polysuccinimide is in the ranges of about 500 to greater than about 1,000,000, more preferably within the range of about 1,500 to about 500,000, and most preferably within the range of about 5,000 to about 200,000.

The amount of the polyamine crosslinking agent preferably is in the range of about 0.001 moles to about 0.5 moles per mole of succinimide. The amount of organic polyamine component can also be expressed as moles of available diamine per mole of succinimide monomer units x 100%, hereafter referred to as "mole %". On this basis, the amount of crosslinking agent can be in the range of about 0.1 to about 50 mole %.

The preferred amount of available diamine in any given instance is dependent upon the weight average molecular weight ($M_w$) of the polysuccinimide starting material. For polysuccinimides of $M_w$ in the range of about 500 to about 4,000, the preferred amount of available diamine in the crosslinking agent is about 10 to about 30 mole %. For polysuccinimides of $M_w$ in the range of about 4,000 to about 10,000, the preferred amount of available diamine is in the range of about 1 to about 20 mole %. For polysuccinimides of $M_w$ greater than about 10,000 the preferred amount of available diamine is in the range of about 0.2 to about 15 mole %.

The total amine nitrogen functionality with respect to succinimide functionality preferably is maintained at a mole ratio of about 1:1.

The crosslinking can occur between adjacent polymer chains or within the same polymer chain or both. Multiple crosslinks can also be incorporated into the polymer chains.

Compounds useful as polyamine crosslinking agents in practicing the methods of the present invention include, but are not limited to, aliphatic diamines, such as ethylenediamine (EDA), 1,3-bis(aminoethyl)cyclohexane (1,3-BAC), and hexamethylene diamine (HMDA); arylaliphatic diamines, such as meta-xylylene diamine (MXDA); polyether diamines, such as polyoxyalkylenediamines and amine terminated block copolymers of polyoxyalkylene/polyalkylene glycols, sold in varying approximate molecular weights ranges of about 280 to about 2,000 under the trademark JEFFAMINE™ by Huntsman Chemical Company; diamino acids or amino acid derived diamines such as lysine, lysine methyl ester, cystamine, cysteine, cystine, cystine dimethyl ester, or the like.

According to the supplier, the JEFFAMINE™ D series products are amine terminated polypropylene glycols having an average of about 2 to about 68 propylene oxide units, the JEFFAMINE™ ED series of products are amine terminated polyethylene/polypropylene glycols, having a predominantly polyethylene oxide backbone. Other useful polyether amines are triethyleneglycol diamine (JEFFAMINE™ EDR-148, or Huntsman XTJ-504) and tetraethyleneglycol diamine (JEFFAMINE™ EDR-192).

Also useful are amine terminated polyalkyleneimines, such as amine terminated polyethyleneimines including, for example, triamines and pentamines, such as diethylenetriamine (DETA) and tetraethylenepentamine (TEPA).

Additionally, triamino, tetraamino and other polyamino organic compounds can also be used as organic crosslinking agents to form new polymeric networks of the present invention as long as the functional amino groups needed for crosslinking are present. The use of such amino compounds can further lead to incorporation of linking monomer units such as the following $L^4$ and $L^5$ structural formulas, where $R^2$ is a trivalent or tetravalent organic radical linking group derived from the organic crosslinking agent.

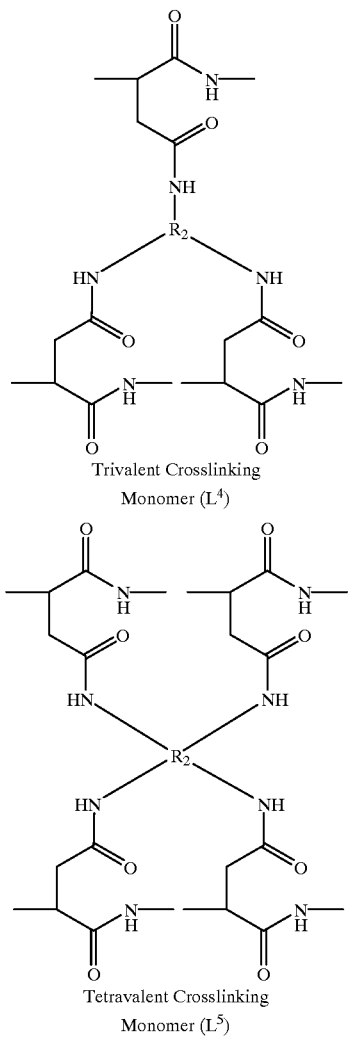

Trivalent Crosslinking Monomer ($L^4$)

Tetravalent Crosslinking Monomer ($L^5$)

Examples of triamino, tetraamino and other polyamino compounds useful as organic crosslinking agents in the present invention include, but are not limited to tris(2-aminoethyl)amine (TAEA), polyamine compounds sold under the trademark STARBURST™ Dendrimers by Dendritech, Inc., the propylene oxide based triamine series sold in various approximate molecular weights ranges of about 440 to about 5,000 under the trademark JEFFAMINE™ T by Huntsman Chemical Company, and polyvinylamine polymers.

Useful nitrogenous bases include ammonia, preferably aqueous ammonia, and organic bases, preferably primary amines and secondary amines. Organic bases suitable for the practice of the present invention include, but are not limited to $C_1$ to $C_{20}$ alkyl amines, such as methyl amine, ethylamine, propylamine, butyl amine, tertiary-butyl amine, diethylamine, triethylamine, lauryl amine, stearyl amine, diisopropylethylamine, isopropylamine, dipropylamine, N-methyl-N-lauryl amine, piperidine, pyrrolidine, and the like; $C_1$–$C_{20}$ aryl amines such as aniline, naphthyl amine, aminophenols, aminonaphthols and the like; hydroxyalkylamines, such as 2-hydroxyethylamine, 3-hydroxypropylamine, 1-aminopropylene glycol, 2-aminopropylene glycol diethanolamine, triethanolamine, and the like; sulfo or phosphonoalkylamines, such as taurine, 3-sulfopropylamine, 2-phosphonoethylamine, 3-phosphonoethylamine or the like; dialkylamino substituted amines, such as 3-(N,N-dimethyl)propylamine, 2-(N,N-dimethyl)ethylamine and the like; and nitrogen ring containing aromatic amines such as pyridine, indole, and the like.

Also useful are amines derived from amino acids having, in aqueous alkaline solution, an ionizable amino group with a pK value of about 8 or above, such as the naturally occurring amino acids, glycine, alanine, aspartic acid, glutamic acid, cystine, cysteine, leucine, serine, phosphoserine and the like; and the non-naturally occurring amino acids, beta-alanine, gamma-aminobutyric acid and the like.

Preferably, super-absorbing polymeric networks of the present invention swell or gel in the presence of water to at least about 10 times to over 200 times their dry weight, and in the presence of electrolyte, such as synthetic urine, to at least about 10 times to over 30 times their dry weight.

Briefly described, a super-absorbing polymeric network of polyaspartate of this invention can be produced employing a single reaction vessel by crosslinking polysuccinimide with an organic crosslinking agent in the presence of a nitrogenous base in an aqueous reaction mixture. The nitrogenous base provides sufficient alkalinity to simultaneously hydrolyze any remaining succinimide monomer units and hydrolyzes the crosslinked polysuccinimide to a polyaspartate based super-absorbing polymeric network that can then be isolated from the reaction mixture, and recovered in the form of a gel or a substantially dry solid.

In one preferred method aspect, a water solution of organic diamine crosslinking agent is admixed with a nitrogenous base, preferably a primary amine, a secondary amine, or aqueous ammonia, in mole quantities theoretically calculated to sufficiently and completely crosslink or hydrolyze all of the succinimide monomer units of a polysuccinimide of a selected $M_w$. Next, the aforesaid aqueous alkaline solution is admixed with substantially dry polysuccinimide to form a slurry. The polysuccinimide is therein crosslinked by the diamine crosslinking agent and simultaneously hydrolyzed by the alkalinity of the aqueous nitrogenous base to a polymeric network comprising crosslinked polyaspartate. The polymeric network can then be isolated as a substantially dried solid or by filtration or centrifugation followed by decantation of supernatant liquid and then recovered as a substantially dried solid for use as a super-absorbing polymeric network. Drying can be effected at ambient pressure or reduced pressure and is usually done at a temperature range of about 30° C. to about 80° C.

A variation of the foregoing procedure can be practiced by suspending the polysuccinimide in water and then admixing the suspended polysuccinimide with an aqueous solution of diamine crosslinking agent and nitrogenous base to form the polymeric network or alternatively, by admixing the crosslinking agent and nitrogenous base sequentially into the aqueous polysuccinimide suspension.

In another method embodiment, a water solution of diamine crosslinking agent and nitrogenous base can be admixed with substantially dry polysuccinimide to form a polymeric network gel product. The polymeric network gel product can then be diluted with excess added water and the pH of the diluted reaction mixture adjusted to a pH of about 7 to about 9 with sufficient added inorganic alkali, or acid as required.

The polymeric network can then be isolated by washing the gel product with water and filtering and then recovered by drying the filtered polymeric network to a substantially dry solid, such as in a forced air oven at a temperature of about 60° C. A variation of the isolation procedure can be practiced by deswelling the polymeric network gel product by adding alcohol, such as methanol or the like, to the foregoing diluted reaction mixture and then isolating the polymeric network by washing with water and filtering and then recovering the polymeric network by drying the filtered polymeric network to a substantially dry solid in a vacuum oven at a temperature of about 60° C.

In yet another method embodiment, a water solution of diamine crosslinking agent and nitrogenous base can be admixed with substantially dry polysuccinimide to form a polymeric network gel product. The polymeric network gel product can then be washed with water and filtered. The filtered, washed polymeric network gel product can be suspended in water and sufficient acid selected from inorganic acids (preferably sulfuric acid or hydrochloric acid) or organic acid (preferably acetic acid or maleic acid) added to deswell the gel. The polymeric network gel product can then be filtered, re-suspended in water, and sufficient aqueous alkali (preferably aqueous 50% wt/wt sodium hydroxide) added to adjust the pH of the resulting gelatinous mixture to at least about 9 and sufficient alcohol, such as methanol or the like, added to further deswell the gel. The polymeric network can then be isolated by filtering and recovered by drying to a substantially dry solid form in a forced air oven or vacuum oven.

When primary amines, secondary amines or ammonia are utilized, the free base can also react with the polysuccinimide to introduce aspartamide units C and D into the resulting super-absorbing polymeric network.

Surprisingly, the minimum water absorbency and electrolyte solution absorbency of super-absorbing polymeric networks produced by the methods of this invention was at least about 10 times their dry weight.

The following examples illustrate the preparation of embodiments of super-absorbing polymeric networks of polyaspartates from polysuccinimide by the various methods discussed. The examples and methods presented are illustrations of preferred embodiments and are not intended as limitations.

WATER ABSORBENCY ANALYSIS METHOD

The super-absorbing characteristics of the polymeric networks of crosslinked polyaspartate of this invention were demonstrated by the following protocol employing an aqueous solution of Blue Dextran. This method is known in the art as the Blue Dextran Method. One description of the method can be found in U.S. Pat. No. 5,284,936 to Donachy et al., the relevant portions of which are incorporated herein by reference.

Blue Dextran is a high molecular weight (about 2 million Daltons), water soluble polymer to which a blue colored dye is covalently attached. The method relies upon the exclusion of the Blue Dextran from super-absorbent materials during the absorption of water from a test solution.

When a super-absorbing polymeric network is allowed to swell in an aqueous solution containing Blue Dextran, the large molecular size of the Blue Dextran molecule results in its being excluded from the swollen gel pores. The result of this exclusion is that the concentration of the Blue Dextran in the supernatant liquid increases. Thus, the amount of water absorbed by the polymeric network can be assessed by the change in Blue Dextran concentration over that of the control, measured spectrophotometrically at 617 nanometers.

Blue Dextran Method

A 0.002% (w/w) Blue Dextran solutions was prepared by dissolving Blue Dextran either in water or in an electrolyte solution (synthetic urine).

For assessing water absorbency, a substantially dried, solid, super-absorbing polymeric network product of this invention was treated with Blue Dextran solutions in the following manner. The super-absorbing polymeric network product (about 100 milligrams (mg)) was suspended in an aqueous Blue Dextran solution (about 20 grams (g)) with stirring mixing for about one hour. The suspension of swelled gel was then centrifuged for about 5 minutes at high speed setting and the centrifuged supernatant liquid collected. The absorbance of the supernatant liquid at 617 nm was determined using a spectrophotometer. The absorbance of the Blue Dextran solution itself at 617 nm was also determined. The specific absorbency (i.e., grams of water per gram of dry polymer) of the super-absorbing polymeric network was then calculated by the following equation.

$$\frac{\text{Specific}}{\text{Absorbency}} = \left(\frac{\text{mass Blue Dextran}}{\text{mass Polymer}}\right)\left(1 - \frac{\text{absorbance Blue Dextran}}{\text{absorbance Supernatant}}\right)$$

For assessing electrolyte absorbency, the same procedure was followed, except that synthetic urine was employed instead of water and the specific absorbency against that of Blue Dextran in synthetic urine was determined. The synthetic urine was prepared by combining NaCl (10.09 g), $CaCl_2 \cdot 2H_2O$ (0.3015 g), $MgCl_2$ (0.5938 g), and an aqueous solution of the nonionic surfactant, octoxynol-9, sold under the trademark TRITON® X-100 by Union Carbide Corporation, (2.5 g of 1% by weight solution) and diluting the combination to 1 liter with deionized water. A similar recipe can be found in U.S. Pat. No. 5,284,936 to Donachy et al.

The present invention is illustrated further by the following examples.

EXAMPLES 1–15

Method of Synthesis of Super-Absorbing Polymeric Networks

The following general procedures were utilized in the preparation of the super-absorbing polymeric networks of Examples 1–15. Each method comprised a synthesis step, referred to herein as Reaction Method A, B, C or D and an isolation/recovery step, referred to herein for convenience as Isolation Workup Method A, B, C, D, E, F, and G as described below.

Reaction Method A

A solution of crosslinking agent, nitrogenous base and water was prepared. The solution then was added to dry polysuccinimide and the resulting reaction mixture was mixed with stirring until a gel reaction mixture was produced.

Reaction Method B

A solution of crosslinking agent, nitrogenous base and water was prepared. The solution then was added to a separately prepared mixture of water and dry polysuccinimide and the resulting reaction mixture was mixed until a gel reaction mixture was produced.

Reaction Method C

A solution of crosslinking agent, nitrogenous base and water was prepared. The solution then was added to dry polysuccinimide and the resulting reaction mixture was mixed with stirring until a gel reaction mixture was produced. The gel reaction mixture then was diluted with water (about one liter) and its pH was adjusted to about pH 11 by the addition of aqueous 50% wt/wt sodium hydroxide.

Reaction Method D

Nitrogenous base and crosslinking agent were added sequentially to a separately prepared mixture of water and dry polysuccinimide and the resulting reaction mixture was mixed until a gel reaction mixture was produced.

Isolation Workup Method A

The crude gel reaction mixture obtained by the reaction method was dried to a substantially dry solid polymeric network in a forced air oven at a temperature of about 60° C.

Isolation Workup Method B

The crude gel reaction mixture obtained by the reaction method was washed with water and filtered. The washing and filtering steps were repeated several times to remove any water-soluble substances that may be present. The washed, isolated polymeric network was then dried to a substantially dry solid form in a forced air oven at a temperature of about 60° C.

Isolation Workup Method C

The crude gel reaction mixture obtained by the reaction method was washed with water and filtered. The washing and filtering steps were repeated several times, to remove any water-soluble substances that may be present. The washed, filtered polymeric network gel was then deswelled by the addition of methanol. The polymeric network was isolated by filtration and then dried to a substantially dry solid in a forced air oven at a temperature of about 60° C.

Isolation Workup Method D

The procedure of Isolation Workup Method C was followed, except that the drying step was carried out under reduced pressure in a vacuum oven at a temperature of about 60° C.

Isolation Workup Method E

The crude gel reaction mixture obtained by the reaction method was diluted with excess water to produce a free-flowing mixture. The diluted gel reaction mixture was then centrifuged and the supernatant liquid was decanted. The sequential water washing, centrifugation and decanting steps were repeated several times to remove any water-soluble substances that may be present. The washed and filtered polymeric network gel was then deswelled by the addition of methanol.

The polymeric network was isolated by centrifugation, decantation of supernatant liquid and then dried to a substantially dry solid in a vacuum oven at a temperature of about 60° C.

Isolation Workup Method F

The crude gel reaction mixture obtained by the reaction method was washed with water and filtered. Either sulfuric acid (18M, 98% w/w), hydrochloric acid (12M, 370 w/w) or maleic anhydride was slowly added with stirring to deswell the gel.

The deswelled gel product was then filtered, suspended in water and sufficient aqueous 50% wt/wt sodium hydroxide was added to adjust the pH of the resulting gelatinous suspension to about pH 9 and then deswelled by the addition of methanol. The polymeric network was then isolated by filtration and dried to a substantially dry solid in a vacuum oven at a temperature of about 60° C.

Isolation Workup Method G

The procedure of Isolation Workup Method F was followed except that the drying step was carried out in a forced air oven at a temperature of about 60° C.

Examples 1–15 illustrate the preparation of super-absorbing polymeric networks by crosslinking polysuccinimide having a $M_w$ in the range of about 5,000 to about 35,000 by practicing the Reaction Methods and Isolation Workup Methods described above and in the combination indicated in Table 1 below, and the water absorbing specificity (ratio of grams water absorbed/gram super-absorbing polymeric network) achieved by the Blue Dextran Method.

TABLE 1

Synthesis of Super-Absorbing Polymeric Networks of Polyaspartate from Crosslinked Polysuccinimide (PSI), Reaction Methods and Water Absorbency

| Example | Mw of PSI (amu) | Reaction Method (Amounts of Reactants discussed below) | Isolation Workup Method | Water Absorbed (g/g) |
|---|---|---|---|---|
| 1 | 35,000 | D | A | 21 |
| 2 | 5,000 | B | A | 15 |
| 3 | 35,000 | B | C | 29 |
| 4 | 35,000 | A | F | 16 |
| 5 | 35,000 | A | D | 16 |
| 6 | 35,000 | A | D | 17 |
| 7 | 35,000 | A | F | 65 |
| 8 | 35,000 | A | F | 76 |
| 9 | 35,000 | A | E | 44 |
| 10 | 35,000 | A | F | 20 |
| 11 | 25,000 | C | B | 72 |
| 12 | 25,000 | C | D | 93 |
| 13 | 25,000 | C | C | 141 |
| 14 | 25,000 | C | G | 230 |
| 15 | 15,000 | A | G | 50 |

PSI = Polysuccinimide.
Mw = weight average molecular weight as determined by Size Exclusion Chromatography.
amu = atomic mass unit Amounts of Reactants Employed During Reaction Method Indicated Example 1

Triethyleneglycol diamine (Huntsman XTJ-504; about 13.7 grams (g.)) as the crosslinking agent and aqueous ammonium hydroxide (15M, about 49.5 milliliters (ml)) as the nitrogenous base, were added sequentially to a separately prepared mixture of about 200 ml water and about 100 g. dry polysuccinimide.

Example 2

The solution of crosslinking agent, nitrogenous base and water contained about 20.7 g. triethyleneglycol diamine (Huntsman XTJ-504) as the crosslinking agent, about 43.3 milliliters (ml) of aqueous 15M ammonium hydroxide as the nitrogenous base, and about 50 ml water. The solution then was added to a separately prepared mixture of about 50 ml water and about 100 g. dry polysuccinimide.

Example 3

The solution of crosslinking agent, nitrogenous base and water contained about 13.8 g. triethyleneglycol diamine (Huntsman XTJ-504) as the crosslinking agent, and about 103 ml of triethylamine (dissolved in 120 ml water) as the nitrogenous base. The solution then was added to a separately prepared mixture of about 120 ml water and about 100 g. dry polysuccinimide.

Example 4

The solution of crosslinking agent, nitrogenous base and water contained about 13.7 g. triethyleneglycol diamine (Huntsman XTJ-504) as the crosslinking agent, about 45.3 g. ethanolamine as the nitrogenous base, and about 100 ml. water. The solution then was added to about 100 g. dry polysuccinimide.

Example 5

The solution of crosslinking agent, nitrogenous base and water contained about 6.87 g. triethyleneglycol diamine (Huntsman XTJ-504) and about 10.4 g. cystamine dihydrochloride as the crosslinking agents, about 49.5 ml of aqueous 15M ammonium hydroxide as the nitrogenous base, and about 100 ml. water. The solution then was added to about 100 g. dry polysuccinimide.

Example 6

The solution of crosslinking agent, nitrogenous base and water contained about 20.8 g. cystamine dihydrochloride as the crosslinking agent, about 68 ml of aqueous 15M ammonium hydroxide as the nitrogenous base, and about 100 ml. water. The solution then was added to about 100 g. dry polysuccinimide.

Example 7

The solution of crosslinking agent, nitrogenous base and water contained about 6.87 g. triethyleneglycol diamine (Huntsman XTJ-504) as the crosslinking agent, about 49.5 ml aqueous 15M ammonium hydroxide as the nitrogenous base, and about 100 ml. water. The solution then was added to about 100 g. dry polysuccinimide. In the Isolation Workup Method, maleic anhydride was employed as a source of maleic acid in the acidification step.

Example 8

The solution of crosslinking agent, nitrogenous base and water contained about 4.12 g. triethyleneglycol diamine (Huntsman XTJ-504) as the crosslinking agent, about 49.5 ml ammonium hydroxide as the nitrogenous base, and about 100 ml. water. The solution then was added to about 100 g. dry polysuccinimide. In the Isolation Workup Method, sulfuric acid was employed in the acidification step.

Example 9

The solution of crosslinking agent, nitrogenous base and water contained about 46.87 g. triethyleneglycol diamine (Huntsman XTJ-504) as the crosslinking agent, about 45.3 g. ethanolamine as the nitrogenous base, and about 100 ml. water. The solution then was added to about 100 g. dry polysuccinimide.

Example 10

The solution of crosslinking agent, nitrogenous base and water contained about 6.87 g. triethyleneglycol diamine (Huntsman XTJ-504) as, the crosslinking agent, about 39.2 ml aqueous 18.94M sodium hydroxide, about 55.6 g. glycine as the nitrogenous base, and about 100 ml. water. This solution was prepared by adding glycine to water and then adding sodium hydroxide to the resulting admixture. Triethylene glycol diamine was added thereafter. The solution then was added to about 100 g. dry polysuccinimide. In the Isolation Workup Method, sulfuric acid was employed in the acidification step.

Example 11

The solution of crosslinking agent, nitrogenous base and water contained about 51.4 g. cystamine dihydrochloride as the crosslinking agent, about 124 ml of aqueous 15M ammonium hydroxide as the nitrogenous base, and about 250 g. of crushed ice. The solution then was added to about 250 g. dry polysuccinimide.

Example 12

The solution of crosslinking agent, nitrogenous base and water contained about 38.4 g. aqueous 70% hexamethylenediamine as the crosslinking agent, about 124 ml of aqueous 15M ammonium hydroxide as the nitrogenous base, and about 250 g. of crushed ice. The solution then was added to about 250 g. dry polysuccinimide.

Example 13

The solution of crosslinking agent, nitrogenous base and water contained about 38.4 g. aqueous 70% hexamethylenediamine as the crosslinking agent, about 124 ml of aqueous 15M ammonium hydroxide as the nitrogenous base, about 38.7 ml. of 12M hydrochloric acid, and about 250 g. of crushed ice. The hydrochloric acid was used to change the diamine into a monohydrochloride salt or a dihydrochloride salt. The solution was formed by adding ammonium hydroxide to the ice and then adding the diamine followed by hydrochloric acid. Thereafter the resulting solution was added to about 250 g. dry polysuccinimide.

Example 14

The solution of crosslinking agent, nitrogenous base and water contained about 38.4 g. aqueous 70% hexamethylenediamine as the crosslinking agent, about 124 ml of aqueous 15M ammonium hydroxide as the nitrogenous base, about 38.7 ml. of 12M hydrochloric acid, and about 250 ml. water. The solution was formed by adding ammonium hydroxide to the. water and then adding the diamine followed by hydrochloric acid. Thereafter the resulting solution was added to about 250 g. dry polysuccinimide. In the Isolation Workup Method, sulfuric acid was employed.

Example 15

The solution of crosslinking agent, nitrogenous base and water contained about 76.9 g. aqueous 70% hexamethylenediamine as the crosslinking agent, about 247 ml of aqueous 15M ammonium hydroxide as the nitrogenous base, about 38.7 ml. of 12M hydrochloric acid, and about 500 g. of crushed ice. The order of addition of ingredients was the same as in Example 13. In the Isolation Workup Method, sulfuric acid was employed.

As shown in Table 1, the water absorbency of each of the super-absorbing polymeric networks prepared in Examples 1–15, as determined by the Blue Dextran Method, was in the range of about 15 to 230 times the dry weight of the polymer network.

Example 16

This example illustrates a method for preparing a super-absorbing polymeric network of polyaspartate of this invention from polysuccinimide crosslinked in an aqueous medium by a diamine crosslinking agent in the presence of a nitrogenous base.

Polysuccinimide (928 mmol, about 100 g.) was added to a resin flask. To this flask was added, with stirring, a solution of ammonium hydroxide (742 mmoles, about 49.5 ml) as the nitrogenous amine, triethyleneglycol diamine (Huntsman XTJ-504) (46.4 mmoles, about 6.87 g) as the crosslinking agent, and water (about 100 ml). The resulting crosslinked polymeric network product was in the form of a wet gel.

The gelatinous reaction mixture was then suspended in water (about 500 ml) to form a gelatinous suspension. Maleic anhydride (742 mmoles, about 72.8 g.) was added to the gelatinous suspension to lower the pH of the suspension to a range of about pH 1 to about pH 2 and deswell the gelatinous suspension. The suspension of polymeric network gel was filtered and the polymeric network gel isolate was re-suspended in water (about 500 ml). The re-suspended gel product further deswelled on its own and was filtered again.

The filtered gel product was then suspended in aqueous methanol (50/50 v/v) and the pH of the resulting gelatinous suspension was adjusted to about pH 10 by the addition of aqueous 18.94M sodium hydroxide. The gelatinous suspension was then deswelled by the addition of methanol to produce a substantially solid polymeric network product. The polymeric network was then filtered and dried to a substantially solid form in a vacuum oven at about 60° C.

The water and electrolyte solution absorbency of the resulting polymeric network of polyaspartate was determined via the Blue Dextran Method. Water absorbency was 65 times the dry weight of polymeric network gel. Electrolyte solution (synthetic urine) absorbency by the Blue Dextran Method was about 12 times the dry weight of polymeric network gel.

Example 17

This example illustrates another method for preparing a super-absorbing polymeric network of polyaspartate of this invention from polysuccinimide crosslinked in an aqueous medium by a diamine crosslinking agent in the presence of a nitrogenous base. Polysuccinimide (Mw 15,000; 4.64 mole, about 500 g.) was added to a rotary blade mixer (KitchenAid™) To this was added a separately prepared solution of aqueous 15 M ammonium hydroxide (3.71 mole, about 247 ml) as the nitrogenous base, aqueous 70% hexamethylenediamine (464 mmol, about 76.9 g. solution) as the crosslinking agent, aqueous 12 M hydrochloric acid (464 mmol, about 38.7 ml), and melted crushed ice (500 g.). The mixture was stirred until a substantially dry and spongy gelatinous reaction product formed.

The foregoing procedure was repeated four separate times and the resulting gels were combined. The gel combination was suspended in sufficient water to produce a freely flowable suspension. Sufficient concentrated sulfuric acid (18M; 98% w/w) was then added to lower the pH of the suspension to a range of about pH 1 to about pH 2 and deswell the polymeric network gel suspension. The deswelled suspension was then filtered and the polymeric network gel isolate was washed twice with water.

The polymeric network gel isolate was then suspended in about 12 liters aqueous methanol (50/50 v/v). The pH of the resulting gelatinous suspension was adjusted to about pH 10 by the addition of aqueous 18.94M sodium hydroxide and then deswelled by the addition of methanol. The polymeric network was isolated by filtration and then dried in a forced air oven at about 60° C. to a substantially dry solid.

The water and electrolyte solution absorbency of the resulting polymeric network of crosslinked polyaspartate was determined via the Blue Dextran Method. Water absorbency was about 50 times the dry weight of polymeric network gel. Electrolyte solution (synthetic urine) absorbency was about 32 times the dry weight of polymeric network gel.

Example 18

This comparative example illustrates the preparation of super-absorbing polymeric network of polyaspartate employing inorganic alkali instead of nitrogenous base during the crosslinking of polysuccinimide by organic diamine crosslinking agent.

The procedure of Example 17 was followed, except that the nitrogenous base used was replaced by aqueous 18.94 M sodium hydroxide (3.71 mole, about 196 ml) and a single reaction procedure was practiced. A slightly gelatinous mixture was obtained.

The resulting polymeric network of polyaspartate had a water absorbency of about 9 times the dry weight of polymeric network gel and an electrolyte solution (synthetic urine) absorbency of about 1.1 times the dry weight of polymeric network gel.

A comparison of the water and electrolyte solution (synthetic urine) absorbency of the inventive super-absorbing polymeric network gel of Example 17 with that of the product of comparative Example 18 shows that the preparation of the super-absorbing polymeric network in the presence of nitrogenous base greatly improves the water absorbing characteristics of super-absorbing polymeric networks derived from the crosslinking polysuccinimide in an aqueous medium compared to those of such product prepared in the presence of alkali metal hydroxide.

Examples 1–17 illustrate that super-absorbing polymeric networks of the present invention have water absorbencies in a range of from at least about 10 to more than about 200 times the dry weight of polymeric network. Examples 16 and 17 also illustrate that super-absorbing polymeric networks of the present invention have minimum electrolyte solution (synthetic urine) absorbencies of at least about 10 times the dry weight of polymeric network. This level of absorbency was achieved in a substantially aqueous medium and avoids cost and environmental problems associated with the use of polar aprotic solvents such as DMF, DMSO and the like.

I claim:

1. A method of producing a polymeric network of crosslinked polyaspartate comprising the steps of:
   a) reacting polysuccinimide in an aqueous medium and in the presence of a nitrogenous base which is a member of the group consisting of ammonia, primary amine and secondary amine, with a crosslinking agent that is an organic base having at least two primary amine groups to form a crosslinked polysuccinimide product in a reaction mixture; the nitrogenous base being present in an amount sufficient to hydrolyze the crosslinked polysuccinimide to a polymeric network of crosslinked polyaspartate;
   b) isolating the produced polymeric network of crosslinked polyaspartate from the reaction mixture; and
   c) recovering the isolated polymeric network of crosslinked polyaspartate.

2. The method of claim 1 wherein the reaction mixture in step (a) is at a temperature range of about 30° C. to about 80° C. and is maintained at said temperature range until the polymeric network of crosslinked polyaspartate forms.

3. The method of claim 1 wherein the polymeric network of crosslinked polyaspartate is isolated in step (b) by filtering, and is recovered in step (c) by drying the filtered polymeric network of crosslinked polyaspartate.

4. The method of claim 1 wherein the polymeric network of crosslinked polyaspartate is isolated in step (b) by washing with water, and then removing excess water therefrom.

5. The method of claim 1 wherein the polymeric network of crosslinked polyaspartate is isolated in step (b) by washing with a liquid which is a member of the group consisting of water, alcohol and mixtures thereof.

6. The method of claim 1 wherein the polymeric network of polyaspartate is in the form of a gel or solid.

7. The method of claim 1 wherein the polysuccinimide in step (a) has a weight average molecular weight in the range of about 500 to greater than about 100,000.

8. The method of claim 1 wherein the nitrogen amine functionality with respect to succinimide functionality is in a mole ratio of about 1:1.

9. The method of claim 1 wherein the organic crosslinking agent is in the form of a salt of an acid selected from the group consisting of a mineral acid and an organic acid.

10. The method of claim 1 wherein the crosslinking agent is a polyamine selected from the group consisting of an aliphatic diamine, an arylaliphatic diamine, a polyether diamine, a diamine derived from an amino acid, a polyether polyamine, and mixtures thereof.

11. The method of claim 1 wherein the nitrogenous base is selected from the group consisting of ammonia, an amine or an amino acid having an ionizable amino group that, in aqueous alkaline solution, has a pK value of at least about 8, and mixtures thereof.

12. The method of claim 1 further including the step of adjusting the pH of the product to a desired pH during the isolating step (b).

13. A super-absorbing polymeric network of polyaspartate obtained by the method of claim 1 which is a random copolymer comprised primarily of aspartate units and dimeric aspartamide units with less than about 20% succinimide units.

14. A super-absorbing polymeric network of polyaspartate obtained by the method of claim 1 which is a random copolymer comprised primarily of aspartate units and aspartamide units with less than about 20% succinimide units.

15. The super-absorbing polymeric network of polyaspartate obtained by the method of claim 14 wherein the aspartamide units are alpha aspartamide units having the structural formula:

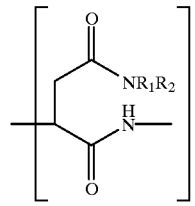

wherein $R^1$ and $R^2$ are independently selected from the group consisting of H, $C_1$ to $C_{20}$ alkyl or substituted alkyl, aryl or substituted aryl, $NH_2$, NHOH, $C_1$ to $C_{20}$ hydroxyalkyl, $C_1$ to $C_{20}$ thioalkyl, sulfonoalkyl or phosphonoalkyl, and dialkylamino substituted $C_1$ to $C_{20}$ alkyl.

16. The super-absorbing polymeric network of polyaspartate obtained by the method of claim 14 wherein the aspartamide units are beta aspartamide units having the structural formula:

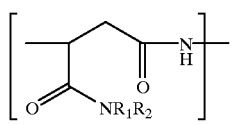

wherein $R^1$ and $R^2$ are independently selected from the group consisting of H, $C_1$ to $C_{20}$ alkyl or substituted alkyl, aryl or substituted aryl, $NH_2$, NHOH, $C_1$ to $C_{20}$ hydroxyalkyl, $C_1$ to $C_{20}$ thioalkyl, sulfonoalkyl or phosphonoalkyl, and dialkylamino substituted $C_1$ to $C_{20}$ alkyl.

17. A super-absorbing polymeric network of polyaspartate obtained by the method of claim 1 comprising a random copolymer of crosslinked polyaspartate capable of absorbing water in an amount in the range of at least about 10 times to over 200 times its dry weight.

18. A super-absorbing polymeric network of polyaspartate obtained by the method of claim 1 comprising a random copolymer of crosslinked polyaspartate capable of absorbing an electrolyte solution in a minimum amount of at least 10 times its dry weight.

* * * * *

UNITED STATES PATENT AND TRADEMARK OFFICE
CERTIFICATE OF CORRECTION

PATENT NO. : 5,998,491
DATED : December 7, 1999
INVENTOR(S) : Joseph P. Haar, Jr.

It is certified that error appears in the above-identified patent and that said Letters Patent is hereby corrected as shown below:

Column 1,
Before the first line of text, insert:

FIELD OF THE INVENTION
The present invention relates to crosslinked polymers. More particularly, the invention relates to new polymeric networks capable of absorbing large quantities of water or aqueous solutions, and to methods for preparing such super-absorbing polymeric networks.

BACKGROUND OF THE INVENTION
The term "water-swellable polymeric networks" as used herein refers to highly crosslinked polymers that have a propensity to swell or gel in the presence of water. Water-swellable polymeric networks have found wide use in a variety of applications. See, for example, Odian, G., Principles of Polymerization, 3rd Edition, published by Wiley-Interscience, New York, 1991 and Glass, J.E., Ed. "Polymers in Aqueous Media Performance Through Association,"Advances in the Chemistry Series 223, published by the American Chemical Society, Washington, D.C., (1989).

Water-swellable polymeric networks which are well known in the polymer arts include, but are not limited to, carboxymethylcellulose, crosslinked polyacylates, graft copolymer hydrolysis products of starch-acrylonitrile, polyvinyl alcohol resins, polyethylene oxide resins, polyvinylcaprolactam, crosslinked polyaspartates, and polyacrylonitrile resins.

UNITED STATES PATENT AND TRADEMARK OFFICE
CERTIFICATE OF CORRECTION

PATENT NO.  : 5,998,491
DATED       : December 7, 1999
INVENTOR(S) : Joseph P. Haar, Jr.

It is certified that error appears in the above-identified patent and that said Letters Patent is hereby corrected as shown below:

Except for crosslinked polyaspartates, most of these polymeric materials are not readily biodegradable and thus contribute to the overall chemical burden on the environment when they are released into effluent streams. Crosslinked polyaspartates are biodegradable, but there are several synthetic problems associated with their manufacture that make them somewhat expensive.

Signed and Sealed this

Nineteenth Day of June, 2001

*Attest:*

*Attesting Officer*

NICHOLAS P. GODICI
*Acting Director of the United States Patent and Trademark Office*